United States Patent [19]

Brüggemann

[11] Patent Number: 4,611,193
[45] Date of Patent: Sep. 9, 1986

[54] ELECTRIC DISPLAY DEVICE OF A VEHICLE

[75] Inventor: Ulrich Brüggemann, Oberursel, Fed. Rep. of Germany

[73] Assignee: VDO Adolf Schindling AG, Frankfurt am Main, Fed. Rep. of Germany

[21] Appl. No.: 648,449

[22] Filed: Sep. 7, 1984

[30] Foreign Application Priority Data

Sep. 8, 1983 [DE] Fed. Rep. of Germany ....... 3332385

[51] Int. Cl.$^4$ .............................................. B60Q 1/00
[52] U.S. Cl. ................. 340/52 F; 340/52 R; 340/525; 340/514; 371/29
[58] Field of Search .............. 340/52 F, 52 R, 52 D, 340/525, 64, 514; 364/424; 371/3, 7, 10, 15, 16, 17, 23, 29

[56] References Cited

U.S. PATENT DOCUMENTS

| | | | |
|---|---|---|---|
| 4,031,363 | 6/1977 | Freeman et al. | 340/52 F |
| 4,317,364 | 3/1982 | Asano et al. | 340/52 F |
| 4,344,136 | 8/1982 | Panik | 340/52 F |
| 4,497,057 | 1/1985 | Kato et al. | 340/52 F |

Primary Examiner—Donnie L. Crosland
Attorney, Agent, or Firm—Martin A. Farber

[57] ABSTRACT

An electric display device for a vehicle, particularly a motor vehicle, has at least one display instrument, at least one memory which stores a desired display value and can be set with the display instrument in a test phase, as well as switch means for the switchable dividing of pulses of a variable to be displayed, in particular a speed of rotation. In order to be able, during the test phase, to check a division which has been set, the memory stores at least two desired display values. The output of each of the stored desired display values to the display instrument is switchable by the switch, which also effects the switching of the division. In this way, during the test phase, only the desired display value which corresponds to the setting of the switchable division of pulses is shown.

8 Claims, 4 Drawing Figures

ELECTRIC DISPLAY DEVICE OF A VEHICLE

FIELD AND BACKGROUND OF THE INVENTION

The invention relates to an electric display device for a vehicle, particularly a motor vehicle, with at least one indicating instrument, with a memory which stores at least one desired display value to which the display means can be set in testing mode, and with switch means for the switchable division of pulses of a variable to be indicated, particularly a speed of rotation.

Such electric display devices can be developed with liquid crystals in order to produce all display functions of a so-called combination instrument for an automotive vehicle. The combination instrument may comprise digital speed display means as well as quasi-analog rpm display means in addition to segments for warning fields, symbols, units and legends.

The display means are controlled by a microcomputer to which measurement variables such as rpm, distance increments, oil pressure, temperature and tank level are fed via converters or pulse-forming means. The microcomputer converts the measurement variables into segment displays, in particular into digits and quasi-analog displays.

In order to make certain that the display means are able to display the measurement variables properly when the vehicle is in operation, a so-called testing mode is called up, in the case of an electric display device, before the operating of the vehicle and, in particular, directly after the turning on of the ignition, which mode, due to the programming of the microcomputer, can proceed automatically.

This is done in the manner that the quasi-analog display means, such as speed of rotation and tank level, increment, starting from a minimum display value, to the maximum value and remain there for some time. On the other hand, with the digital speed display means, characteristic successions of digits are displayed in the testing mode, including a sequence of digits by which the segments are covered as completely as possible.

This testing mode proceeds automatically during the test phase when the ignition is turned on. The display means is then switched to normal operation for display of the actual measured variables. This switching can, however, also take place already during the test phase so that, for instance, the driver of the vehicle can be advised of the operating conditions upon starting. This premature external switching can be produced by a signal from the oil pressure, the generator, the starter, or the ignition terminal of the ignition coil.

By switching, such indicating means can be adapted to different types of vehicles and engines. In particular, adaptation of the measurement of the speed of rotation to the number of cylinders of the engine is necessary if the ignition pulses are evaluated. For this purpose, there is provided in a microcomputer, a programmable divider which, before the processing of the rpm pulses, reduces them depending on the number of cylinders. Another adaptation can be conceivable for the so-called Vehicle W Constant*, by which the distance-increment pulses are adapted to the gear transmission ratio. For the switching of the display device, a switch can be provided which, before the installation of the display device, is brought into a position which corresponds to the pertinent, in part varying, vehicle parameters. One could conceive of pasting a legend on the display device for the important verification of the adapted setting or tearing it off from same or else stamping a control tag. These processes are, however, at least time consuming. Furthermore, as a result of these measures, and in particular in the case of retrofitting of the vehicle in a workshop, erroneous adaptations can occur.

*The number of revolutions of the crank shaft in the highest gear upon movement of the vehicle over a distance of 100 m.

The present invention, therefore, has the object of so developing an electric display device of the aforementioned type that the correct adjustment of the display device can be checked with increased certainty upon the final verification. The pasting on or tearing off of a legend or the stamping of a control tag ought to be expendable in order to save time. A retrofitting in the workshop should be particularly installation-reliable.

SUMMARY OF THE INVENTION

This object is achieved by the invention in the manner that for the display of the division which has been set, the memory (30) is adapted to store at least two desired display values (e.g. 124, 126) and that the display in each case of one of the stored desired display values on the display means (3) is switchable by means of the switch means (coding switch 22).

Thus, the display device in the testing mode does not display a desired display value which is independent of the setting of the switch means such as—in an embodiment of the display means as digital speed display means—the digital value 123, but rather a desired display value which represents the setting of the switch means. In the said digital embodiment of the speed display means, this can, for instance, either be the sequence of digits 124 or 126, depending on whether the switch means for the switchable division of rpm pulses are set to the conditions of a four-cylinder Otto engine or a six-cylinder Otto engine. Similar to this, one characteristic sequence of digits such as 124 for a diesel engine and the other characteristic sequence of digits such as 126 for a turbodiesel engine can be prepared together with the switching of the switch means of the rpm pulses, which are obtained here from the generator, for the display in the testing mode.

In the testing mode, therefore, with the display device there is automatically displayed a desired display value, particularly a sequence of digits, which corresponds to the otherwise not readily recognizable setting of switch means in the display device. Thus, there is advantageously eliminated the necessity of another, more cumbersome and less reliable verification such as the pasting on or tearing off of a legend before the installation of the indicating device in the vehicle or the stamping of a control slip. The certainty of the correct setting of the switch means is therefore increased, particularly also in the event of a retrofitting of the display device in a workshop.

It is of essential importance that, for the showing of the setting of the switch means, there be used indicating means which need not be influenced in the specific mode of operation or in an ordinary testing mode. For this purpose, the desired display values associated with the switch positions are stored and are fed selectively to the display means most suitable for the display. In particular, the setting of switch means for rpm pulses is shown by the speed display means equipped for digital display but not by the quasi-analog rpm display means.

On the other hand, the showing of the setting of the switch means for the switchable division of pulses or the coding of a programmable divider in the display device is not limited to digital display means. Rather, one desired display value out of a plurality of stored desired display values which is associated with the setting of the switch means for the switchable division or the coding of a programmable divider can be shown in the testing mode by a pointer instrument, the pointer being moved up to a stop corresponding to the desired display value in order to make the setting recognizable.

Preferably, within the memory (30) there is contained another non-switchable desired display value (e.g. 288) which can be transmitted alternatively to the display means (3). In this way, all segments of a digital number display can be displayed in a given section of the test phase although, in another section, the digital display represents the setting of the switch means.

One particularly preferred embodiment by which a display means which, as combination instrument, comprises digital speed display means, rpm display means and a coding switch for switching a programmable divider of rpm impulses can be automatically comprehensively tested is characterized by the fact that: the memory (30) stores a first sequence of digits containing a possible number of cylinders of the vehicle engine (25) as desired display value (e.g. 124), a second sequence of digits containing another possible number of cylinders as desired display value (e.g. 126) and a third series of digits activating substantially all segments of the digital speed display means (3) as desired display number (e.g. 288); the memory (30) is connected to the digital speed display means (3); by the coding switch (22), a memory part (e.g. 31', 32', 34') which stores the first desired display number or a memory part which stores the second desired display number (e.g. 31', 32', 33') can be removed from memory; program control means (32) are provided by which the first or second memory part is activable in a first section of the test phase and thereupon a third memory part (38, 39, 40) is activable to output data in a second section of the test phase. This is done in the final analysis in the manner that, controlled by the program control means, a sequence of digits such as 124 or 126, which corresponds to the setting of the switch means or coding adapted to the type of engine, is shown in a first section of the test phase. In a second test phase the display means are excited in such a manner that all segments are activated with the display means intact. Thereupon, as a result of the continued operation of the program control means, the display device is automatically switched to the operating mode for the showing of the actual measured values.

The program control means (32) can be started by an ignition switch directly after the turning on of the ignition. The program control means 32) can be initiated by an ignition switch of the vehicle.

The program control means (32) can be switched automatically after the end of the test phase, as well as prematurely by external means, to operational display by the display means. The transfer from the test phase to the operating mode for display of the actual measured values can be effected automatically by the program control means (32) or else prematurely by an external signal in order to show the measured values, e.g. during the critical starting process. The signal for switching to the operating mode for the display of the actual measured values can be derived from the oil pressure, the starter, the generator or the ignition pulses.

In inexpensive manner, the display device is equipped for switching only one digit of a sequence of digits which is represented together as desired display number in the test phase. In this way, in particular, a selection logic of the digits can be obtained at little expense. Here, the memory parts 31', 32', 33', 34' are equipped for the storing of, in each case, one multi-place first and second sequence of digits and in each case only one digit (in 33', 34') can be switched in these memory parts.

Further according to the invention, the memory parts (30), the program control (32) and the means (27) for the switchable division are contained within a microcomputer (8).

The display device having the features indicated can be obtained with a microcomputer for the utilization of the known advantages of the latter.

BRIEF DESCRIPTION OF THE DRAWINGS

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENT

Figure 1:
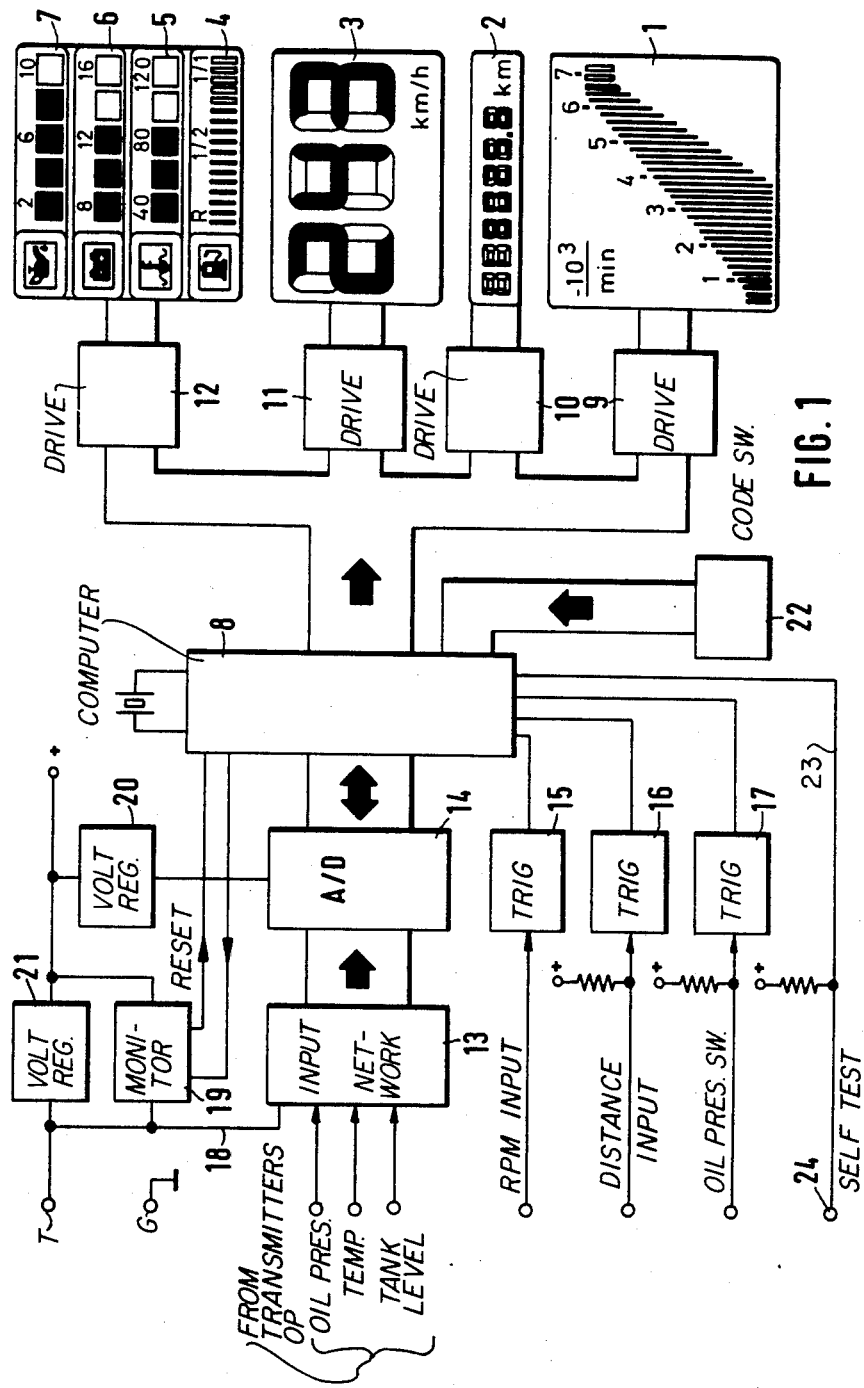
FIG. 1 is a simplified block diagram of the entire display device.

Referring to FIG. 1, the display device includes a bar graph display 1 for displaying the rpm of an automotive vehicle, an odometer 2, a speed or tachometer display 3, as well as four displays 4–7 constructed with segments on the manner of a bar graph display for tank level, water temperature, battery voltage and oil pressure.

All displays, including the indication of the dimensions and symbols for the measurement variables, are developed with liquid crystals.

The segments of these liquid crystals are controlled by a microcomputer 8 via drivers 9–12.

The controlling of the display means shown is effected corresponding to the measurement values for the tank level, the water temperature, the oil pressure and the voltage which are fed into the microcomputer via a suitable input network 13 and an analog-digital converter 14. The measurement variables for the rpm, the distance travelled and the speed are fed via a Schmitt trigger and monoflop 15 or via a Schmitt trigger 16 into the microcomputer.

A signal from an oil-pressure switch is fed by a Schmitt trigger 17 to the microcomputer. Furthermore, the microcomputer is controlled from the terminal T via a line 18, the input network 13, and the analog-digital converter 14. In this way, first of all, after the turning on of the ignition, the microcomputer can be operated in a test phase in the testing mode in which all segments of the display means 1–7 are operated in order to show the driver of the vehicle that all segments, particularly those having warning functions, are operating properly. The segments of the speed display are displayed in two sections, first of all in a characteristic smaller number and then with a second number which indicates as a series of digits all the segments which can be used, e.g. 288 (in connection with which a segment of the "1" showing can, in addition, be controlled in digit 2).

For example, by the oil pressure switch, one can switch prematurely from this test phase into the operating mode for detection of the actual measurement values.

The display device furthermore includes a monitoring circuit 19 which monitors the proper course of the program of the microcomputer 8 and otherwise resets the microcomputer. For the operation of the analog-digital converter, a source of reference voltage 20 is provided. The monitoring circuit and the source of reference voltage are fed by a voltage regulator 21.

The display device also comprises coding switches 22, which serve as switch means for adaptation of the microcomputer to the specific type of engine upon the processing of the rpm pulses.

Finally, there is provided a line 23 which is led out from the microcomputer and provides a connection 24 for the carrying out of a workshop test.

Figure 2:
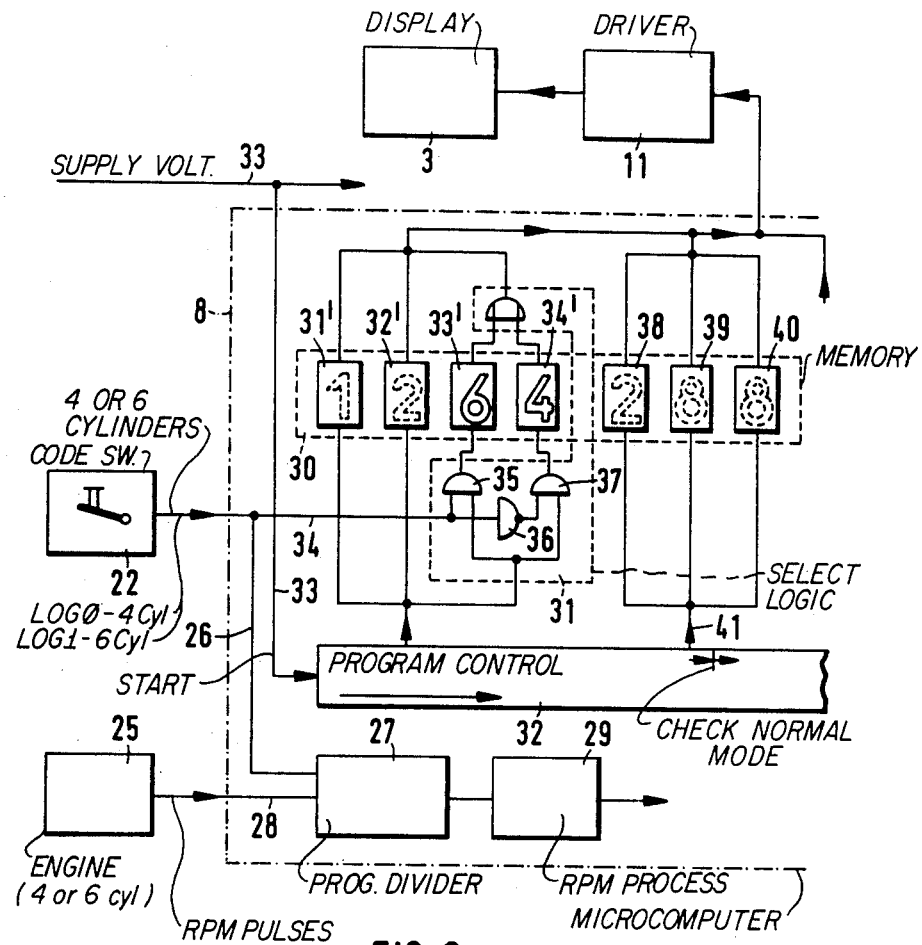
FIG. 2 is a part of the block diagram, shown in greater detail, with the switch means, the memories, the desired display values and the program control.

In FIG. 2, the assemblies and elements and the display device which are provided for the carrying out of the testing mode after the turning on of the ignition by the driver of the vehicle are shown in further detail.

Insofar as possible, the same reference numbers are used for corresponding elements or assemblies in FIGS. 1 and 2, but minor deviations between the two showings are also possible.

In the arrangement shown in FIG. 2, there is concerned the fact that the coding switch 22 is set in the proper manner for the display of the rpm of an Otto engine 25. The coding switch is connected via a line 26 with a programmable divider 27 whose divider ratio can be set to two or three depending on whether a four-cylinder engine or a six-cylinder engine is concerned. Via a line 28, rpm pulses are fed to the divider 27 and then conducted to the microcomputer in a reduced number of pulses for further processing of the speed of rotation - Block 29.

In order to symbolize the correct setting of the coding switch 22 adapted to the type of engine by the display, namely the speed display 3 during a test phase, a sequence of digits corresponding to the setting of the coding switch can be shown during a section of a test phase by the speed display 3.

For this purpose, within this section of the test phase, different sequences of digits can be read out of a memory 30 depending on the setting of the coding switch 22, namely 124 for a four-cylinder engine and 126 for a six-cylinder engine. For this purpose, digits 1, 2, 6 and 4 are so stored in a first memory part 31' to 34' that the segments of these digits can be activated in the speed display 3. The digits 1 and 2 are activated in each case during the corresponding section of the test phase while the activating of the digits 4 or 6 is effected by a selection logic 31 depending on the setting of the coding switch 22.

For this purpose, the selection logic receives, via a line 34, for instance, a logical 1 during a first section of a test phase from program control means 32 which are started by a start signal on the line 33. In the event that the coding switch is set to a six-cylinder engine and also gives off a logical 1, a memory element 33' is activated via an AND Gate 35. In the other case—setting of the coding switch 22 to four-cylinder engine—the activation however takes place by a logical 0 given off by the coding switch 22 via a digital inverter 36, an AND Gate 37 to the memory place 34' which gives a segment showing of the digit 4.

After the first section of the test phase has passed, controlled by the program control means 32, into the second section of the test phase, the memory elements 38–40 instead of the memory elements 31', 32', 33' or 34' are controlled, for as complete as possible an activation of the segments entering into consideration, via a line 41.

After the end of the second section of the test phase, the mode of operation for the depicting of the actual measurement values by means not shown in detail is introduced by the program control. This transfer to the mode of operation for depiction of the actual measurement values can, as mentioned in connection with FIG. 1, also be effected prematurely by an external signal, e.g. from the oil pressure switch.

The electrical display device can also have other, preferably electronic switch means, e.g. an integrated circuit, instead of a microcomputer. In FIG. 1 a final terminal G connects the ground wire to the combination instrument.

Figure 3:
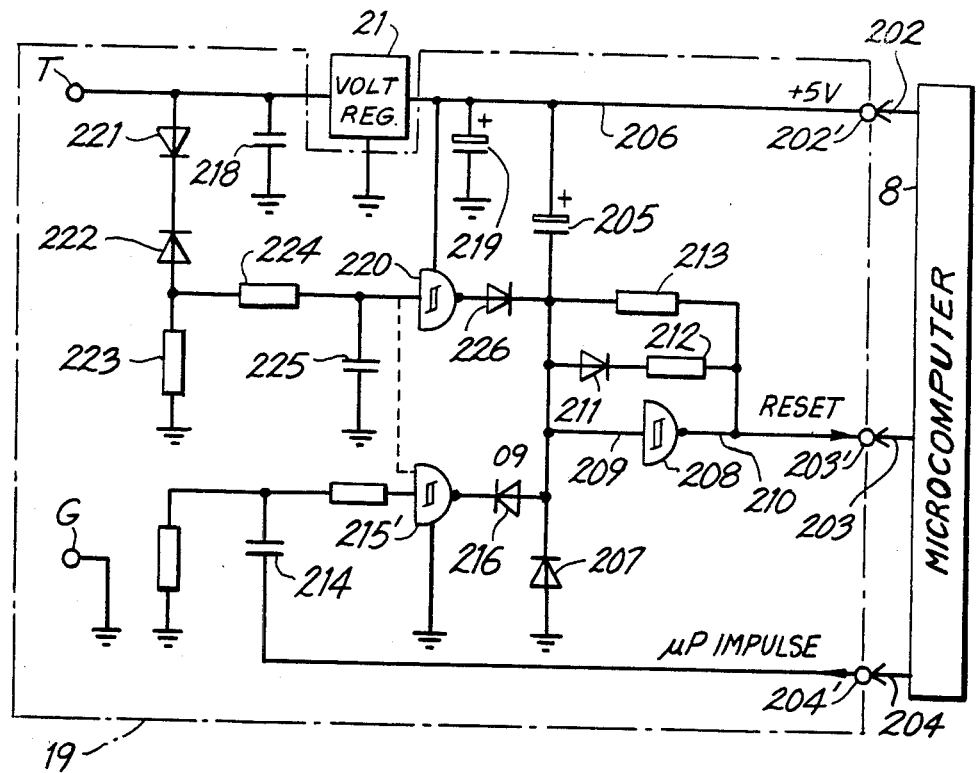
FIGS. 3 and 4 show a circuit and timing diagram of a watch-dog monitoring unit.
Figure 4:
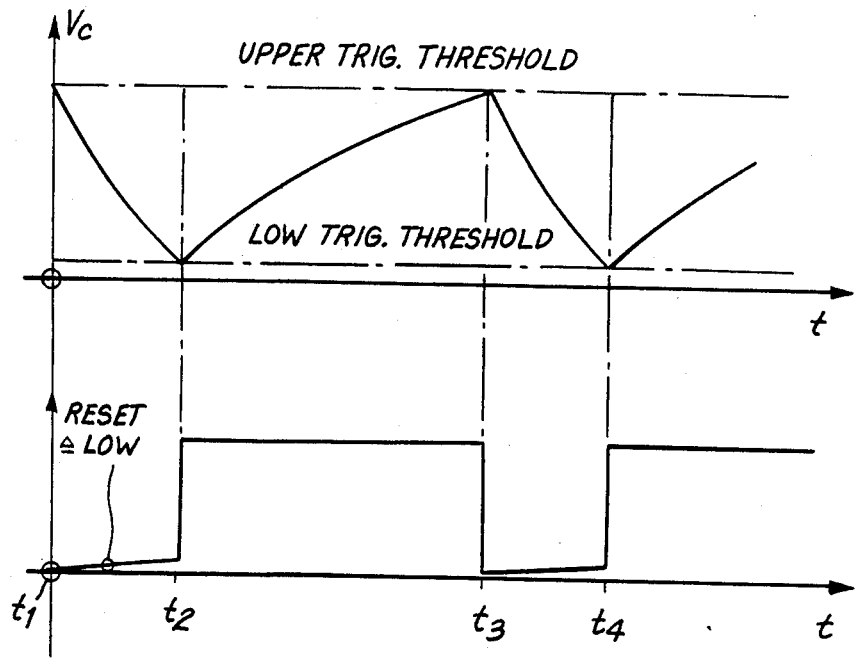

With reference to FIGS. 3 and 4, there is now provided a description of the construction and operation of a monitoring circuit 19.

The microcomputer 8, which may also be a microprocessor, has a terminal 202 for the feeding of a stabilized operating voltage, a terminal 203 for the feeding of a reset pulse by which the microcomputer can be reset in case of a disturbance in the program, as well as a terminal 204 at which microcomputer pulses appear in case of undisturbed execution of the program in the microcomputer. These terminals are intended for connection to corresponding terminals 202', 203' and 204' of a monitoring circuit arrangement, over which terminals the stabilized operating voltage is given off, a reset pulse is fed into the microcomputer in case of a malfunction and the microcomputer pulses are transmitted in order to check the proper execution of the program.

The heart of the monitoring circuit is a single time-determining capacitor 205 which is connected on one side to the +5V line 206 of the regulated operating voltage and on the other side to ground via a diode 207. The diode 207 is so biased that the capacitor 205 is briefly discharged in the event of a glitch in the regulated operating voltage on the line 206.

In this and other cases of malfunction, a reset signal is given off to the terminal 203' by a first Schmitt trigger 208, the input 209 of which is connected to the time-determining capacitor 205.

In a negative feedback branch between the input 209 and an output 210 of the Schmitt trigger there is a series connection of a diode 211 with a relatively low-ohmic resistor 212 used for establishing a discharge time for the capacitor 205. The diode 211 is so biased that the capacitor 205 is charged at the low output level of the Schmitt trigger 208—low signal. In parallel with the series connection consisting of the diode 211 and the resistor 212, there is a second resistor 213 contained in a negative feedback branch. The second resistor 213 is of relatively high-ohmic value as compared with the first resistor 213, and is also used for establishing a discharge time for the capacitor 205. The capacitor 205 discharges via the resistor 213 when the output potential at the output 210 is high.

Thus, two time constants are formed with the capacitor 205, namely, with the relatively high ohmic resistor 213 a relatively long time interval within which microcomputer pulses are to occur when the microcomputer is functioning properly, and with the relatively low-ohmic resistor 212, the period of time of a reset pulse, which is relatively brief as compared with said interval.

The Schmitt trigger 208 with its negative feedback elements 211–213 and the capacitor 205 acts, as will be described further below, as an astable multivibrator and oscillates as long as no microcomputer pulses are present at the terminal 204'.

The microcomputer pulses are fed, via a coupling capacitor 214, into a second Schmitt trigger 215'. The output of the second Schmitt trigger 215 is connected via another diode 216 to the input 209 of the first Schmitt trigger and to the capacitor 205. The diode 216 is so biased that the capacitor 205 is briefly charged via the diode 216 when a positive microprocessor pulse occurs. (All of the Schmitt triggers are of inverting action).

Therefore, by the second Schmitt trigger 215, the first Schmitt trigger 208 is triggered into a given condition upon the occurrence of a positive microcomputer pulse which marks the start of the predetermined time interval within the next microcomputer pulse is to occur when the microcomputer is operating properly.

The operating voltage, particularly the voltage of the electrical system of an automobile, is present at the terminals T and G. The voltage is regulated by means of the regulator 21 connected between the terminal T and the line 206. A capacitor 218 serves as input protection and another capacitor 219 is provided as a filter.

The unregulated operating voltage at the terminal T is applied to a third Schmitt trigger 220 via a protective diode 221, a voltage-reducing zener diode 222 which includes a small resistor 223, and a series resistor 224. Any noise pulses which may be present are suppressed by the capacitor 225. The output of the third Schmitt trigger 220 is connected to the time-determining capacitor 205 and to the input 209 of the first Schmitt trigger 208 by a diode 226 which is biased in such a manner that the capacitor 205 is discharged when the operating voltage at the terminal T is too low and the output of the third inverting Schmitt trigger 220 assumes a high potential. A continuous reset signal is produced in this connection by the first Schmitt trigger 208.

When a voltage within the normal voltage range is applied to the terminal T, the regulated positive operating voltage potential is present at the capacitor 205 and the input 209 of the first Schmitt trigger 208; see capacitor voltage $V_c$ at the time $t_1$ in FIG. 4. Since the output 210 of the inverting Schmitt trigger in this case has a low potential, the capacitor 205 is charged via the diode 211 and the time-determining resistor 212 until the time $t_2$. Here the potential at the input 209 reaches a lower trigger threshold, which is shown by a dashed line in FIG. 5. Between $t_1$ and $t_2$ a reset pulse which is characterized by low potential (Low) is present at the terminal 203'. As from the time $t_2$ the reset pulse terminates and the capacitor 205 is discharged over the second time-determining resistor 213 since the output 210 is at high potential. This process continues, if no microcomputer pulse appears at the terminal 204', until the time $t_3$ when the upper trigger threshold, which is also represented by a dashed line, has been reached. The interval between $t_2$ and $t_3$ represents the period of time during which a microcomputer pulse should occur in the microcomputer if the program is being executed properly. If this is not the case, for the reason that a malfunction is present, then the Schmitt trigger 208, when the upper trigger threshold is reached, automatically switches itself so that its output potential decreases and marks the start of a reset pulse in order to bring the microcomputer into a suitable starting position. At the same time, the capacitor 205 is again charged over the diode 211 and the resistor 212, which thus determines the duration of the reset pulse up to the time $t_4$.

While the drawing is not shown to scale, the interval between two reset pulses which occur cyclically—in the absence of microcomputer pulses—is typically twenty times longer than the duration of the reset pulse.

If, with the microcomputer operating properly, a positive microcomputer pulse occurs in the interval of predetermined duration, for instance between the times $t_2$ and $t_3$, then the time-determining capacitor 205 is charged practically immediately via the bulk resistance of the Schmitt trigger, developed as CMOS-gate, as though the capacitor 205 were connected to ground. This means that, for instance, at $t_2$ the time interval commences within which, if the microcomputer is operating properly, a microcomputer pulse must again occur so that no reset pulse be given off.

The functions of monitoring the unstabilized operating voltage at the terminal T and the stabilized operating voltage on the line 206 which have been described are so superimposed upon the functions described for monitoring the execution of the program that, in the event of disturbances in voltage, a continuous reset signal is produced and is maintained for the duration of the malfunction.

I claim:

1. An electric display device suitable for a plurality of vehicles, particularly motor vehicles having one or more differing characteristics of construction including number of cylinders and final drive gear ratios, said display device comprising:
   at least one indicating instrument;
   a memory which stores at least one desired display value of said construction characteristics;
   means for setting said indicating instrument to said display value of said memory in a testing mode, said setting means including switch means for the switchable division of a rate of pulses of a variable to be indicated, particularly a speed of rotation, and wherein
   said memory stores, for display of a preset division of pulse rate, at least two desired display values; and wherein
   a display in each case of the of the stored desired display values on said indicating instrument is switchable by means of said switch means.

2. The device according to claim 1, wherein
   said memory stores another desired display value to be transmitted alternatively via said setting means to said indicating instrument.

3. In an electric display device for a vehicle, particularly a motor vehicle, with at least one indicating instrument, with a memory which stores at least one desired display value to which a display means can be set in testing mode, and with switch means for the switchable division of a rate of pulses of a variable to be indicated, particularly a speed of rotation, the improvement wherein
   for display of a preset division of pulse rate, the memory stores at least two desired display values; and wherein a display in each case of one of the stored desired display values on the display means is switchable by means of the switch means, and wherein the display means, as a combination instrument, comprises digital speed display means, rpm display means and said switch means, said switch means including a coding switch and a programmable divider of rpm impulses operated by said coding switch, and wherein the memory stores a first sequence of digits containing a possible number of cylinders of an engine of the vehicle as a desired display value, a second sequence of digits containing another possible number of cylinders as a desired display value, and a third series of digits activating substantially all segments of the digital speed display means as a desired display number; said display device further comprising a program control means, and wherein the memory is connected to the digital speed display means, and by means of the coding switch, a part of the memory which stored the first desired display number or a part of the memory which stores the second desired display number can be deactivated and said program control means activates the first or the second memory part during a first section of a test phase and thereupon a third part of the memory is activated for outputting display data in a second section of the test phase.

4. The device according to claim 3, wherein operation of the program control means is initiatable by an ignition switch of the vehicle.

5. The device according to claim 4, wherein the program control means can be switched automatically after the end of the test phase, as well as prematurely by external means, to a mode of operation providing display by the display means.

6. The device according to claim 3, wherein the memory parts store, in each case, one multi-place first and second sequences of digits and, in each case, only one digit can be switched in these memory parts.

7. The device according to claim 3, further comprising a microcomputer operating with the memory parts, the program control means and the switch means for the switchable division.

8. In an electric display device for a vehicle, particularly a motor vehicle, with at least one indicating instrument, with a memory which stores at least one desired display value to which a display means can be set in testing mode, and with switch means for the switchable division of a rate of pulses of a variable to be indicated, particularly a speed of rotation, the improvement wherein:

for display of a preset division of pulse rate, the memory stores at least two desired display values; and wherein a display in each case of one of the stored desired display values on the display means is switchable by means of the switch means, and wherein within the memory there is contained another non-switchable desired display value which can be transmitted alternatively to the display means, the display means, as a combination instrument, comprises digital speed display means, rpm display means and said switch means, said switch means including a coding switch and a programmable divider of rpm impulse operated by said coding switch, and wherein the memory stores a first sequence of digits containing a possible number of cylinders of an engine of the vehicle as a desired display value, a second sequence of digits containing another possible number of cylinders as a desired display value, and a third series of digits activating substantially all segments of the digital speed display means as a desired display number; said display device further comprising a program control means, and wherein the memory is connected to the digital speed display means, and by means of the coding switch, a part of the memory which stores the first desired display number or a part of the memory which stores the second desired display number can be deactivated and said program control means activates the first or the second memory part during a first section of the test phase and thereupon a third part of the memory is activated for outputting display data in second section of the test phase.

* * * * *